(12) United States Patent
Arana et al.

(10) Patent No.: US 11,548,361 B2
(45) Date of Patent: Jan. 10, 2023

(54) SUPPORT STRUCTURES FOR VEHICLE FRAME MOUNTED BATTERY PACKS

(71) Applicant: FORD GLOBAL TECHNOLOGIES, LLC, Dearborn, MI (US)

(72) Inventors: Marcela Arana, Plymouth, MI (US); Jeffrey A. Walesch, Canton, MI (US); Leonard Anthony Shaner, New Baltimore, MI (US); Greg Gombert, Canton, MI (US); Diego Eduardo Mendoza Hernandez, Mexico City (MX); Mikolaj Tyksinski, Mukwonago, WI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 73 days.

(21) Appl. No.: 16/788,710

(22) Filed: Feb. 12, 2020

(65) Prior Publication Data
US 2021/0245596 A1     Aug. 12, 2021

(51) Int. Cl.
| | | |
|---|---|---|
| *B60K 1/04* | (2019.01) | |
| *H01M 50/10* | (2021.01) | |
| *H01M 50/20* | (2021.01) | |

(52) U.S. Cl.
CPC .............. *B60K 1/04* (2013.01); *H01M 50/10* (2021.01); *H01M 50/20* (2021.01); *B60K 2001/0438* (2013.01); *H01M 2220/20* (2013.01)

(58) Field of Classification Search
CPC .......... B60L 50/64; B60L 50/66; B60K 1/04; B60K 2001/0438; H01M 50/20; H01M 2220/20
See application file for complete search history.

(56) References Cited

U.S. PATENT DOCUMENTS

| | | | | |
|---|---|---|---|---|
| 4,365,681 | A * | 12/1982 | Singh ..................... | H01M 50/20 180/68.5 |
| 9,517,687 | B2 * | 12/2016 | Nakajima ................ | B60K 1/04 |
| 10,005,349 | B2 | 6/2018 | Baccouche et al. | |
| 2008/0196957 | A1 * | 8/2008 | Koike ............... | H01M 10/6566 180/68.5 |
| 2017/0324128 | A1 * | 11/2017 | Milton .............. | H01M 10/6555 |
| 2019/0276081 | A1 | 9/2019 | Otoguro et al. | |
| 2021/0188069 | A1 * | 6/2021 | Friedman .............. | H01M 50/20 |

FOREIGN PATENT DOCUMENTS

| | | |
|---|---|---|
| CN | 208325383 U | 1/2019 |
| KR | 101637266 B1 | 7/2016 |
| WO | 2018/087131 A1 | 5/2018 |

* cited by examiner

*Primary Examiner* — James A English
*Assistant Examiner* — James J Triggs
(74) *Attorney, Agent, or Firm* — Lorne Forsythe; Carlson, Gaskey & Olds, P.C.

(57) ABSTRACT

This disclosure details systems and methods for supporting and protecting vehicle underbody-mounted battery packs. An exemplary electrified vehicle may include a frame, a battery support structure mounted to the frame, and a battery pack. The battery pack is supported relative to the frame by the battery support structure but is not itself directly coupled to the frame. The battery support structure may be configured to provide an under-frame mounting configuration, cross member positioning, skid plate positioning for battery pack protection, weight optimized sub-components, unique shapes for ground clearances, etc.

17 Claims, 5 Drawing Sheets

SUPPORT STRUCTURES FOR VEHICLE FRAME MOUNTED BATTERY PACKS

TECHNICAL FIELD

This disclosure relates to electrified vehicle battery packs, and more particularly to battery support structures for supporting and protecting vehicle underbody-mounted battery packs.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle. A high voltage traction battery pack typically powers the electric machines and other electrical loads of the electrified vehicles.

SUMMARY

An electrified vehicle according to an exemplary aspect of the present disclosure includes, among other things, a frame and a battery support structure mounted to the frame. The battery support structure includes a first mounting surface that mounts outboard of an outboard surface of a first longitudinally extending rail of the frame and a second mounting surface that mounts inboard of the outboard surface of the first longitudinally extending rail. A battery pack is supported relative to the frame by the battery support structure.

In a further non-limiting embodiment of the foregoing electrified vehicle, the frame includes the first longitudinally extending rail, a second longitudinally extending rail, and a cross member extending between the first and second longitudinally extending rails. The battery pack is positioned at least partially between the first and second longitudinally extending rails.

In a further non-limiting embodiment of either of the foregoing electrified vehicles, the battery support structure establishes a metallic exostructure that is a completely separate component from an enclosure assembly of the battery pack.

In a further non-limiting embodiment of any of the foregoing electrified vehicles, a gap extends between a tray of the enclosure assembly and the battery support structure.

In a further non-limiting embodiment of any of the foregoing electrified vehicles, the battery support structure includes a plurality of cross members assemblies and a plurality of beam sections that connect between the plurality of cross member assemblies.

In a further non-limiting embodiment of any of the foregoing electrified vehicles, each of the plurality of cross member assemblies includes a first bracket, a second bracket, and a beam that extends between the first and second brackets.

In a further non-limiting embodiment of any of the foregoing electrified vehicles, the first bracket and the second bracket each include at least one junction configured for receiving one of the plurality of beam sections.

In a further non-limiting embodiment of any of the foregoing electrified vehicles, a first cross member assembly of the plurality of cross members assemblies is positioned at a front portion of the battery support structure, a second cross member assembly of the plurality of cross member assemblies is positioned at a rear portion of the battery support structure, a third cross member assembly of the plurality of cross member assemblies is positioned at a first mid-portion of the battery support structure, and a fourth cross member assembly of the plurality of cross member assemblies is positioned at a second mid-portion of the battery support structure.

In a further non-limiting embodiment of any of the foregoing electrified vehicles, at least one sub-component of the plurality of cross member assemblies is made from a material having a first gauge and at least one sub-component of the plurality of beam sections is made from a material having a second gauge. The second gauge is a different gauge than the first gauge.

In a further non-limiting embodiment of any of the foregoing electrified vehicles, a first fastener is received through an opening of the first mounting surface and a second fastener is received through an opening of the second mounting surface.

In a further non-limiting embodiment of any of the foregoing electrified vehicles, the first mounting surface mounts to a first corresponding mounting surface of a first mounting bracket of the frame and the second mounting surface mounts to a second corresponding mounting surface of a second mounting bracket of the frame.

In a further non-limiting embodiment of any of the foregoing electrified vehicles, the battery support structure includes a curved trim line.

In a further non-limiting embodiment of any of the foregoing electrified vehicles, a first fastener mounts the battery support structure to the frame, a second fastener couples the battery pack, an isolator, and the battery support structure together, and a third fastener mounts the isolator to the battery support structure.

In a further non-limiting embodiment of any of the foregoing electrified vehicles, a skid plate mounts between a first cross member assembly and a second cross member assembly of the battery support structure.

In a further non-limiting embodiment of any of the foregoing electrified vehicles, a plurality of isolators are mounted between the battery pack and the battery support structure.

A method according to another exemplary aspect of the present disclosure includes, among other things, mounting a battery support structure to a battery pack, and mounting the battery support structure to a frame of an electrified vehicle, thereby supporting the battery pack relative to the frame. The battery support structure includes a first mounting surface that mounts directly beneath a longitudinally extending rail of the frame.

In a further non-limiting embodiment of the foregoing method, mounting the battery support structure to the battery pack includes inserting a fastener through the battery support structure, then through an isolator, and then into the battery pack.

In a further non-limiting embodiment of either of the foregoing methods, mounting the battery support structure to the frame includes inserting a fastener through an opening of the first mounting surface and through a corresponding mounting surface of a mounting bracket of the frame, and securing the fastener with a nut.

In a further non-limiting embodiment of any of the foregoing methods, the first mounting surface mounts inboard of an outboard surface of the longitudinally extending rail of the frame.

In a further non-limiting embodiment of any of the foregoing methods, the battery support structure includes a second mounting surface that mounts outboard of the outboard surface of the longitudinally extending rail of the frame.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details systems and methods for supporting and protecting vehicle underbody-mounted battery packs. An exemplary electrified vehicle may include a frame, a battery support structure mounted to the frame, and a battery pack. The battery pack is supported relative to the frame by the battery support structure but is not itself directly coupled to the frame. The battery support structure may be configured to provide an under-frame mounting configuration, cross member positioning for side load protection, skid plate positioning for battery pack protection, weight optimized sub-components, unique shapes for ground clearances, etc. These and other features are discussed in greater detail in the following paragraphs of this detailed description.

Figure 1:
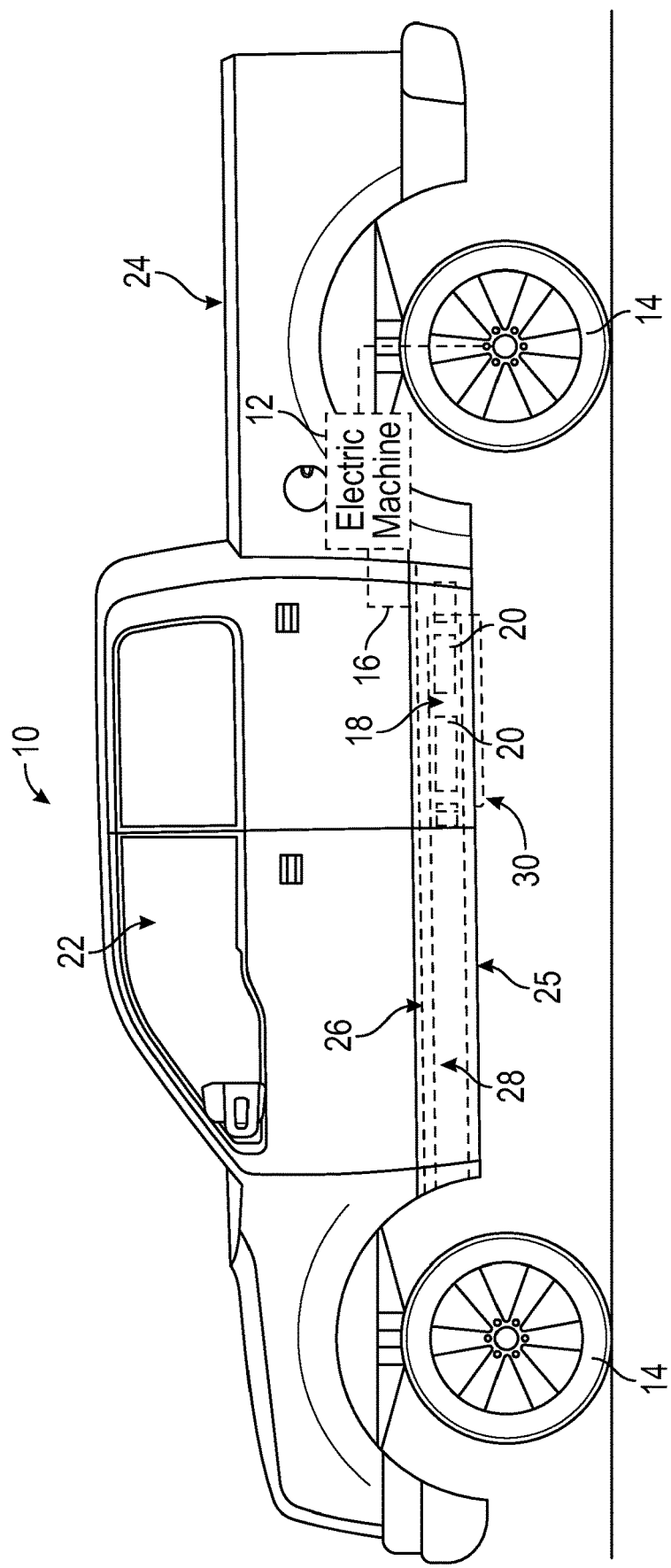
FIG. 1 schematically illustrates an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEV's), fuel cell vehicles, etc. Therefore, although not specifically shown in this embodiment, the electrified vehicle 10 could be equipped with an internal combustion engine that can be employed either alone or in combination with other energy sources to propel the electrified vehicle 10.

In an embodiment, the electrified vehicle 10 is a pickup truck. However, the electrified vehicle 10 could also be a car, a van, a sport utility vehicle, or any other type of vehicle. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component.

In the illustrated embodiment, the electrified vehicle 10 is a full electric vehicle propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14.

A voltage bus 16 electrically connects the electric machine 12 to a battery pack 18. The battery pack 18 is an exemplary electrified vehicle battery. The battery pack 18 may be a high voltage traction battery pack that includes a plurality of battery arrays 20 (i.e., battery assemblies or groupings of rechargeable battery cells) capable of outputting electrical power to operate the electric machine 12 and/or other electrical loads of the electrified vehicle 10. Other types of energy storage devices and/or output devices can also be used to electrically power the electrified vehicle 10.

The battery pack 18 may be mounted at various locations of the electrified vehicle 10. In an embodiment, the electrified vehicle 10 includes a passenger cabin 22 and a cargo space 24 (e.g., a truck bed) located to the rear of the passenger cabin 22. A floor pan 26 may separate the passenger cabin 22 from a vehicle frame 28, which generally establishes the vehicle underbody 25. The battery pack 18 may be suspended from or otherwise mounted relative to the vehicle frame 28 such that it is remote from both the passenger cabin 22 and the cargo space 24. The battery pack 18 therefore does not occupy space that would otherwise be available for carrying passengers or cargo.

Due at least in part to the mounting location at the underbody 25, the battery pack 18 may be susceptible to various vehicle loads including, but not limited to, impact loads (e.g., loads imparted during vehicle impact and running clearance events, for example), durability loads, torsional loads, bending loads, and noise, vibration, and harshness (NVH) loads. Novel battery support structures 30 are therefore proposed in this disclosure. As discussed in greater detail below, the exemplary battery support structures 30 are capable of supporting and protecting the battery pack 18 and isolating the battery pack 18 from the various loads that may be imparted onto the vehicle frame 28 during operations of the electrified vehicle 10.

Figure 2:
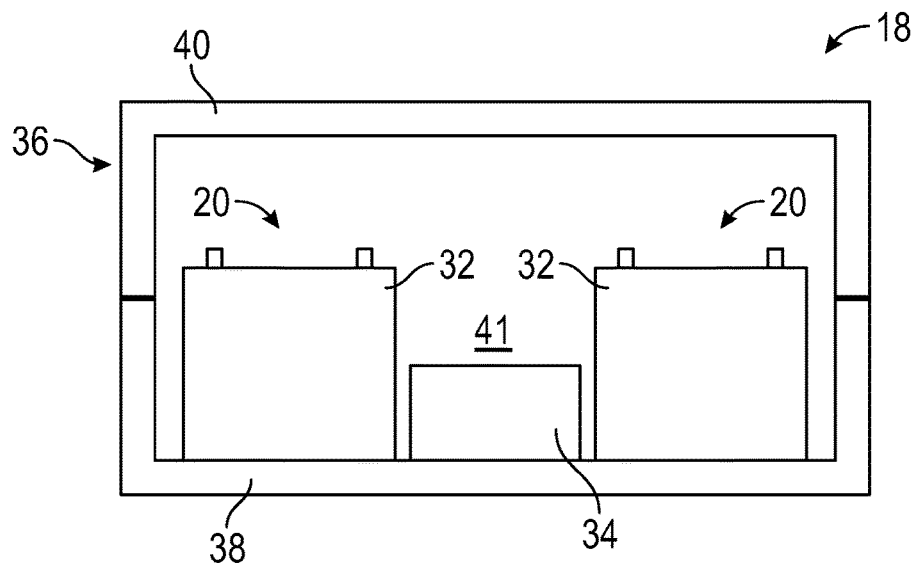
FIG. 2 is a cross-sectional view of a battery pack of an electrified vehicle.

FIG. 2 is a highly schematic, cross-sectional view of the battery pack 18 of FIG. 1. The battery pack 18 may house a plurality of battery cells 32 that store energy for powering various electrical loads of the electrified vehicle 10, such as the electric machine 12 of FIG. 1, for example. In an embodiment, the battery pack 18 houses prismatic, lithium-ion battery cells. However, battery cells having other geometries (cylindrical, pouch, etc.), other chemistries (nickel-metal hydride, lead-acid, etc.), or both could alternatively be utilized within the scope of this disclosure.

The battery pack 18 may additionally house one or more battery electronic components 34. The battery electronic component 34 could include a bussed electrical center (BEC), a battery electric control module (BECM), wiring harnesses, wiring loops, I/O connectors etc., or any combination of these or other battery electronic components.

The battery cells 32 may be grouped together in one or more battery arrays 20. In an embodiment, the battery pack 18 includes two battery arrays 20. However, the total numbers of battery cells 32 and battery arrays 20 employed within the battery pack 18 are not intended to limit this disclosure.

An enclosure assembly 36 may house the battery arrays 20 and the battery electronic components 34 of the battery pack 18. Since the battery arrays 20 and the battery electronic components 34 are housed inside the enclosure assembly 36, these components are considered battery internal components of the battery pack 18. Although an exemplary placement of the battery arrays 20 and the battery electronic components 34 is shown in FIG. 2, this particular placement is not intended to limit this disclosure. The battery internal components of the battery pack 18 could be arranged in any configuration inside the enclosure assembly 36.

In an embodiment, the enclosure assembly 36 is a sealed enclosure. The enclosure assembly 36 may include any size, shape, and configuration within the scope of this disclosure.

The enclosure assembly 36 may include a tray 38 and a cover 40. The tray 38 and the cover 40 cooperate to surround and enclose the battery arrays 20 and the battery electronic components 34. The tray 38 may provide an open area 41 for holding the battery arrays 20 and the battery electronic components 34. After positioning the battery arrays 20 and the battery electronic components 34 within the open area 41, the cover 40 may be seated and sealed to the tray 38 to enclose the battery arrays 20 and the battery electronic components 34.

In an embodiment, the enclosure assembly 36 is a metallic-based component. For example, the tray 38 and the cover 40 could be constructed out of aluminum or steel.

In another embodiment, the enclosure assembly 36 is a polymer-based component. For example, the tray 38 and the cover 40 could be constructed (e.g., molded) of expanded polymer-based materials, solid polymer-based materials, or a combination of such materials. Exemplary expanded polymer-based materials can include, but are not limited to, expanded polypropylene, expanded polystyrene, and expanded polyethylene. Exemplary solid polymer-based materials can include, but are not limited to, sheet moulding compounds (e.g., glass-fiber reinforced polyester), polypropylene, and polyamine.

In yet another embodiment, the enclosure assembly 36 could be constructed of both metallic-based and polymer-based components. For example, the tray 38 could be a metallic-based component and the cover 40 could be a polymer-based component. Other configurations are also contemplated within the scope of this disclosure.

Figure 3:
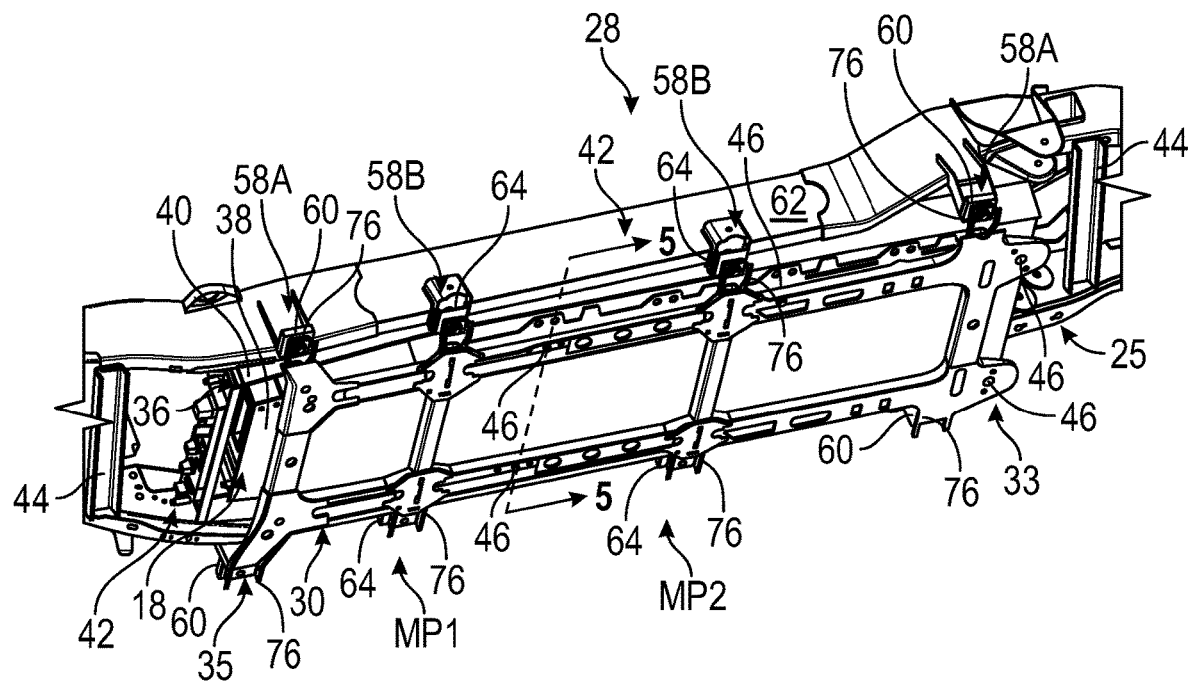
FIG. 3 illustrates select portions of an underbody of an electrified vehicle.
Figure 4:
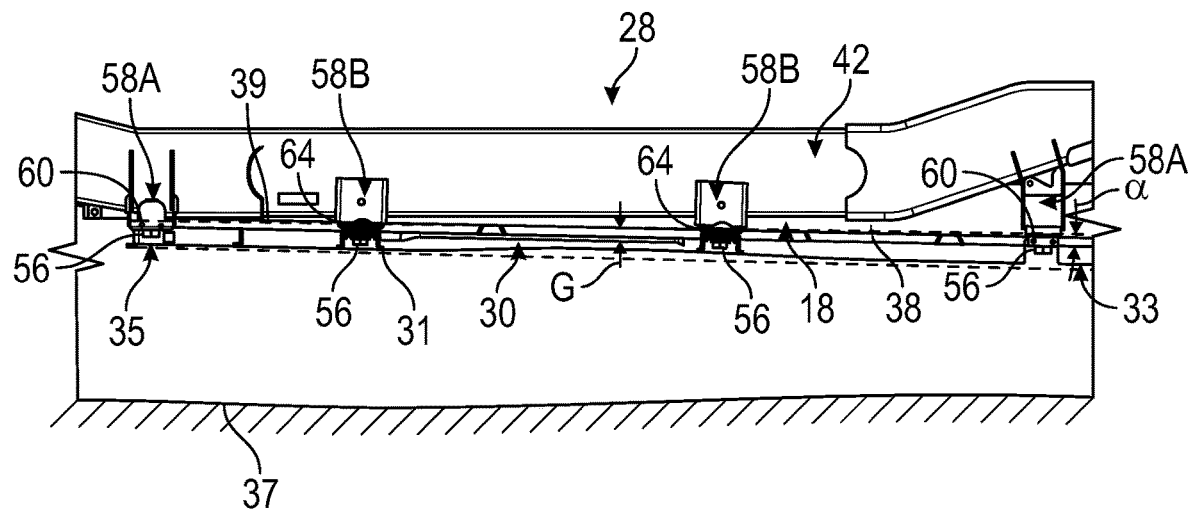
FIG. 4 is a side view of the vehicle underbody depicted in FIG. 3.
Figure 5:
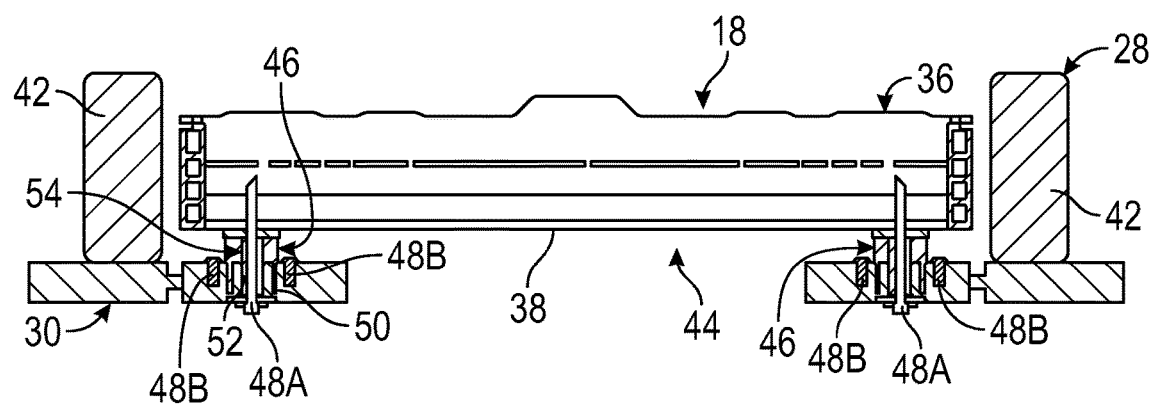
FIG. 5 is a cross-sectional view through section 5-5 of FIG. 3.

FIGS. 3, 4, and 5 illustrate the battery pack 18 mounted relative to a vehicle frame 28 at an underbody 25 of an electrified vehicle, such as the electrified vehicle 10 of FIG. 1. A battery support structure 30 supports the battery pack 18 relative to the vehicle frame 28 and is configured for protecting the battery pack 18 from various vehicle loads. The vehicle frame 28 (sometimes referred to simply as a "frame") is the main supporting structure of the electrified vehicle 10, to which various components are attached, either directly or indirectly. The vehicle frame 28 may include a unibody construction, in which the chassis and body of the electrified vehicle 10 are integrated into one another, or may be part of a body-on-frame construction. The vehicle frame 28 may be made of a metallic material, such as steel, carbon steel, or an aluminum alloy, as non-limiting examples.

The vehicle frame 28 includes a plurality of rails 42 (sometimes referred to as "frame rails" or "beams"). FIGS. 3-5 show two such rails 42. The rails 42 are spaced apart from one another and extend longitudinally (i.e., in parallel with a length of the electrified vehicle 10) to establish a length of the vehicle frame 28. One or more cross members 44 may extend between the rails 42 of the vehicle frame 28. The cross members 44 may generally extend transversely relative to the rails 42 (i.e., in parallel with a width of the electrified vehicle 10) for establishing a width of the vehicle frame 28.

The battery support structure 30 is a separate and distinct component from the enclosure assembly 36 of the battery pack 18. For example, the tray 38 of the enclosure assembly 36 may separate the battery internal components of the battery pack 18 from contacting the battery support structure 30. A gap G may extend between the tray 38 and the battery support structure 30 (see, for example, FIG. 4).

The battery support structure 30 may establish a relatively rigid, metallic exostructure for supporting the battery pack 18 when the battery pack 18 is mounted to the electrified vehicle 10. In addition to supporting the battery pack 18, the battery support structure 30 may also stiffen the vehicle frame 28 for reducing torsional twist and may prevent various loads from being transferred to the battery pack 18.

The battery support structure 30 may be mounted to the battery pack 18, and then an assembly of the battery pack 18 and the battery support structure 30 may be mounted to the vehicle frame 28 to support the battery pack 18 relative to the vehicle frame 28. In the mounted position of the battery pack 18 shown in FIGS. 3-5, the battery pack 18 is positioned at least partially between the rails 42 of the vehicle frame 28 but is not mechanically coupled to the vehicle frame 28. Rather, the battery pack 18 is mechanically decoupled from the vehicle frame 28. In this disclosure, the term "mechanically coupled" means fixedly connected, whereas the term "mechanically decoupled" denotes an absence of any direct connection such that the vehicle frame 28 and the battery support structure 30 substantially absorb loads rather than the battery pack 18.

The battery support structure 30 may include a slightly curved trim line 31 (see FIG. 4) for providing additional ground clearances and off-road capabilities. In addition, in the mounted position, a rear portion 33 of the battery support structure 30 may extend slightly lower than a front portion 35 of the battery support structure 30 relative to a ground surface 37 upon which the electrified vehicle 10 is situated. For example, the rear portion 33 may be slightly tilted at an angle $\alpha$ (e.g., greater than or equal to one degree) relative to a longitudinal axis 39 of the battery pack 18 (see FIG. 4), whereas the front portion 35 is not so tilted.

The battery pack 18 may be secured relative to the battery support structure 30 using a combination of isolators 46 and fasteners 48A, 48B (best shown in FIG. 5). One or more of the isolators 46 may be positioned between the battery pack 18 and the battery support structure 30. The isolators 46, which may be referred to as bushings, are configured to dampen energy that is transmitted to the vehicle frame 28 and/or the battery support structure 30. Stated another way, the isolators 46 act as points of isolation for isolating the battery pack 18 from vibrations and other loads that may act on the vehicle frame 28 and/or the battery support structure 30.

The isolators 46 may permit a relatively small amount of movement to occur between the battery pack 18 and the battery support structure 30. For example, the isolators 46 may allow the battery pack 18 to slightly move in multiple degrees of freedom relative to the battery support structure 30 in order to create a modal misalignment between the battery pack 18 and the battery support structure 30. The modal misalignment can be effective to isolate the battery pack 18 from at least some of the loads that may act on the vehicle frame 28.

As best illustrated in FIG. 5, the battery pack 18, the isolators 46, and the battery support structure 30 may be connected together using the fasteners 48A and 48B. The total number of fasteners 48A and 48B employed may vary per design and is therefore not intended to limit this disclosure. In an embodiment, one of the fasteners 48A may extend through the battery support structure 30, then through one of the isolators 46, and then into the battery pack 18 in order to securely mount each isolator 46 between the battery pack 18 and the battery support structure 30, and two or more of the fasteners 48B may extend through each of the isolators 46 to mount each isolator 46 to the battery support structure 30. In general, the battery pack 18, the isolators 46, and the battery support structure 30 may be coupled together using the fasteners 48A, 48A before fixedly mounting the battery support structure 30 to the vehicle frame 28.

The insertion direction of the fasteners 48B may be opposite from the insertion direction of the fasteners 48A. In an embodiment, the insertion direction of the fasteners 48B extends in a direction from the battery pack 18 toward the battery support structure 30 (i.e., top-down), whereas the insertion direction of the fasteners 48A extends in a direction from the battery support structure 30 toward the battery pack 18 (i.e., bottom-up).

Each isolator 46 may include an outer bushing 50, an inner bushing 52, and a damping portion 54 generally positioned between the outer bushing 50 and the inner bushing 52. The damping portion 54 secures the outer bushing 50 to the inner bushing 52. The inner bushing 52 may be substantially cylindrical and receives a shaft of the fastener 48A. The outer bushing 50 may receive a shaft of the fasteners 48B.

The damping portion 54 may be, for example, a high-carbon rubber that is both elastomeric and, optionally, electrically conductive. In other examples, the damping portion 54 is not electrically conductive. The damping portion 54 could be made of other elastomeric materials, including, polyurethane, silicones, metal-filled silicones, etc. The damping portion 54 is compressible relative to the outer bushing 50 and the inner bushing 52, by way of the elastomeric material, which permits the outer bushing 50 to move and flex relative to the inner bushing 52. While one exemplary isolator 46 has been described, this disclosure extends to other isolator configurations.

After securing the battery pack 18 relative to the battery support structure 30, the battery support structure 30 may be mounted to the vehicle frame 28. The battery support structure 30 may be mechanically affixed to the vehicle frame 28 using a plurality of the fasteners 56 (see FIGS. 4 and 7). In an embodiment, the rails 42 of the vehicle frame 28 include mounting brackets 58A, 58B that are configured for receiving the fasteners 56.

The fasteners 56 may be relatively rigid bolts or screws. Other rigid fasteners could also be used within the scope of this disclosure. The fasteners 56 provide high strength connectors for fixedly mounting the battery support structure 30 to the vehicle frame 28.

The mounting brackets 58A may be configured for connecting to portions of the front portion 35 and the rear portion 33 of the battery support structure 30, and the mounting brackets 58B may be configured for connecting to mid-portions MP1, MP2 of the battery support structure 30 that extend between the front portion 35 and the rear portion 33. The mounting brackets 58A may be configured and arranged differently as compared to the mounting brackets 58B. In an embodiment, the mounting brackets 58A are configured to extend in an outboard direction and the mounting brackets 58B are configured to extend in an inboard direction. For example, the mounting brackets 58A may include mounting surfaces 60 that protrude outboard (i.e., laterally outward in a direction away from the opposite rail 42) relative to an outboard surface 62 of the rails 42, and the mounting brackets 58B may include mounting surfaces 64 that protrude inboard (i.e., in a direction toward the opposite rail 42) relative to the outboard surface 62 of the rails 42.

Figure 6:
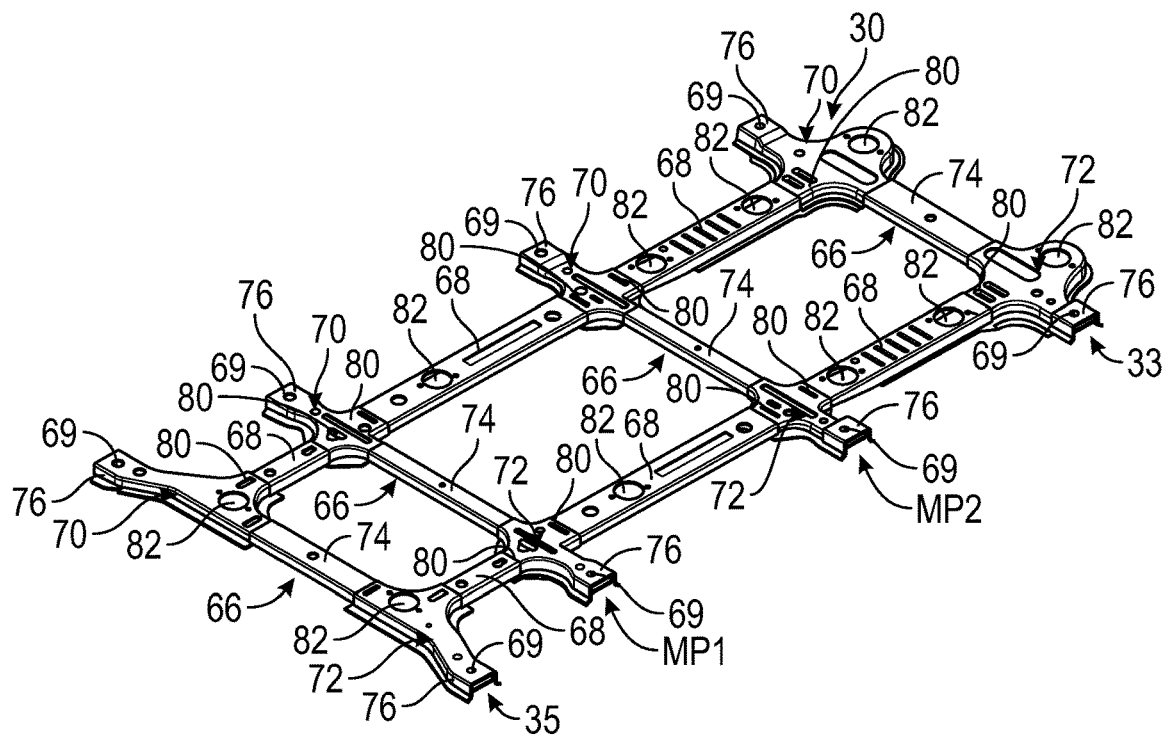
FIG. 6 illustrates an exemplary battery support structure for supporting and protecting a vehicle underbody-mounted battery pack.

Further details of the battery support structure 30 are now described with reference to FIG. 6. The battery support structure 30 may include a plurality of cross member assemblies 66 and a plurality of beam sections 68 that connect longitudinally between the cross member assemblies 66. In an embodiment, the battery support structure 30 includes four cross member assemblies 66, and two beam sections 68 connect between each set of adjacent cross member assemblies 66 for a total of six beam sections 68. However, a greater or fewer number of cross member assemblies 66 and beam sections 68 could be implemented within the scope of this disclosure depending on the designs of the battery pack 18 and the vehicle frame 28, among other factors. The beam sections 68 may be fixedly attached to the cross member assemblies 66, such as via a welding process.

Although the specific configuration is not intended to limit this disclosure, one cross member assembly 66 may be arranged at each of the front portion 35, the rear portion 33, and two mid-portions MP1 and MP2 of the battery support structure 30. The locations of the cross member assemblies 66 of the mid-portions MP1, MP2 may be specifically tailored for increasing the strength and stiffness of the battery support structure 30. For example, in the illustrated embodiment, the cross member assembly 66 of the mid-portion MP1 is specifically located to optimize side pole impact protection once the battery support structure 30 is mounted to the battery pack 18 and the vehicle frame 28.

Each cross member assembly 66 may include a first bracket 70, a second bracket 72, and a beam 74 that connects to and extends between the first and second brackets 70, 72. The beams 74 may establish a main width of the battery support structure 30. However, portions of the first and second brackets 70, 72 may protrude outboard of the beam sections 68.

The first and second brackets 70, 72 may each include a mounting surface 76. The mounting surfaces 76 establish mounting points for mounting the battery support structure 30 to the mounting brackets 58A, 58B of the rails 42 of the vehicle frame 28. The mounting surfaces 76 of the first and second brackets 70, 72 of the cross member assemblies 66 may be slightly raised relative to the beams 74.

The mounting surfaces 76 of the first and second brackets 70, 72 of the cross member assemblies 66 located at the front portion 35 and the rear portion 33 of the battery support structure 30 may mount to the mounting surfaces 60 of the mounting brackets 58A, and the mounting surfaces 76 of the first and second brackets 70, 72 of the cross member assemblies 66 located at the mid-portions MP1, MP2 may mount to the mounting surfaces 64 of the mounting brackets 58B. At least a portion of the mounting surfaces 76 therefore mount directly beneath the rails 42 of the vehicle frame 28.

Fasteners 56 may be inserted through openings 69 formed in the mounting surfaces 76 and then through the mounting surfaces 60 or 64 (i.e., in a bottom-up direction) and may then be secured by a nut 78 (see, e, g., FIG. 7) in order to fixedly mount the battery support structure 30 relative to the vehicle frame 28.

Figure 7:
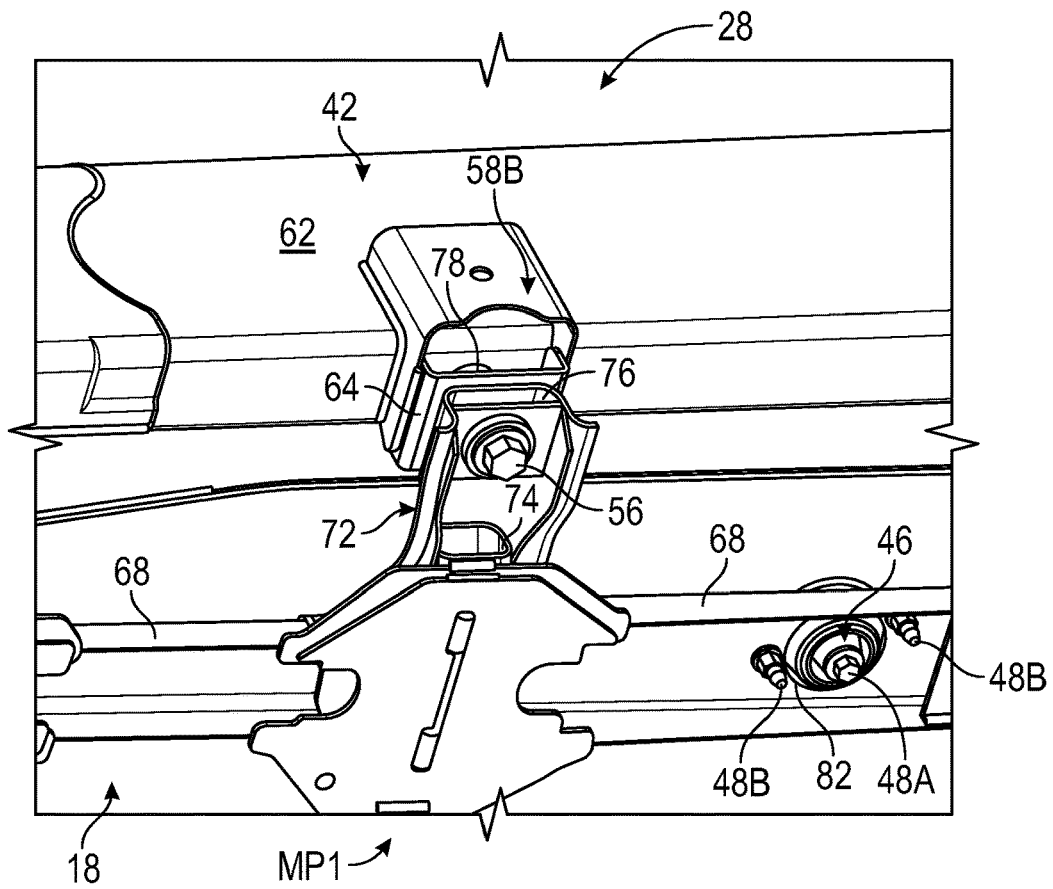
FIG. 7 illustrates an exemplary under rail attachment configuration provided by the battery support structure of FIG. 6.

In an embodiment, the first and second brackets 70, 72 of the cross member assemblies 66 located at the front portion 35 and the rear portion 33 mount to the mounting brackets 58A at a location that is outboard of the outboard surface 62 of the rails 42 (see, e.g., FIG. 3), and the first and second brackets 70, 72 of the cross member assemblies 66 located at the mid-portions MP1, MP2 mount to the mounting brackets 58B at a location this is slightly inboard of the outboard surface 62 of the rails 42 (see, e.g., FIG. 7). The cross members assemblies 66 of the mid-portions MP1, MP2 of the battery support structure 30 therefore establish an "under-frame" attachment configuration for reducing loads into the battery pack 18.

The first and second brackets 70, 72 of each cross member assembly 66 may additionally include one or more junctions 80. The junctions 80 establish connection points for receiving and connecting the beam sections 68. In an embodiment, the first and second brackets 70, 72 of the cross member assemblies 66 located at the front portion 35 and the rear portion 33 each include a single junction 80, whereas the first and second brackets 70, 72 of the cross member assemblies 66 located at the mid-portions MP1, MP2 each include two junctions 80.

Multiple openings 82 may be formed in the battery support structure 30 for accommodating the isolators 46. One or more of the openings 82 could be formed in the beam sections 68, the first and second brackets 70, 72, or within both the beam sections 68 and the first and second brackets 70, 72.

The various sub-components that make up the battery support structure 30 may be made of a stamped, high strength steel. However, other relatively rigid materials and other manufacturing techniques are also contemplated within the scope of this disclosure. In an embodiment, at least a portion of the sub-components of the battery support structure 30 are made of a material having a gauge that is different from the gauge of other sub-components of the battery support structure 30. The material gauges of the components of the battery support structure 30 may be in the range of 2.4 mm (0.094 inches) to 3.5 mm (0.138 inches), in an embodiment.

Figure 8:
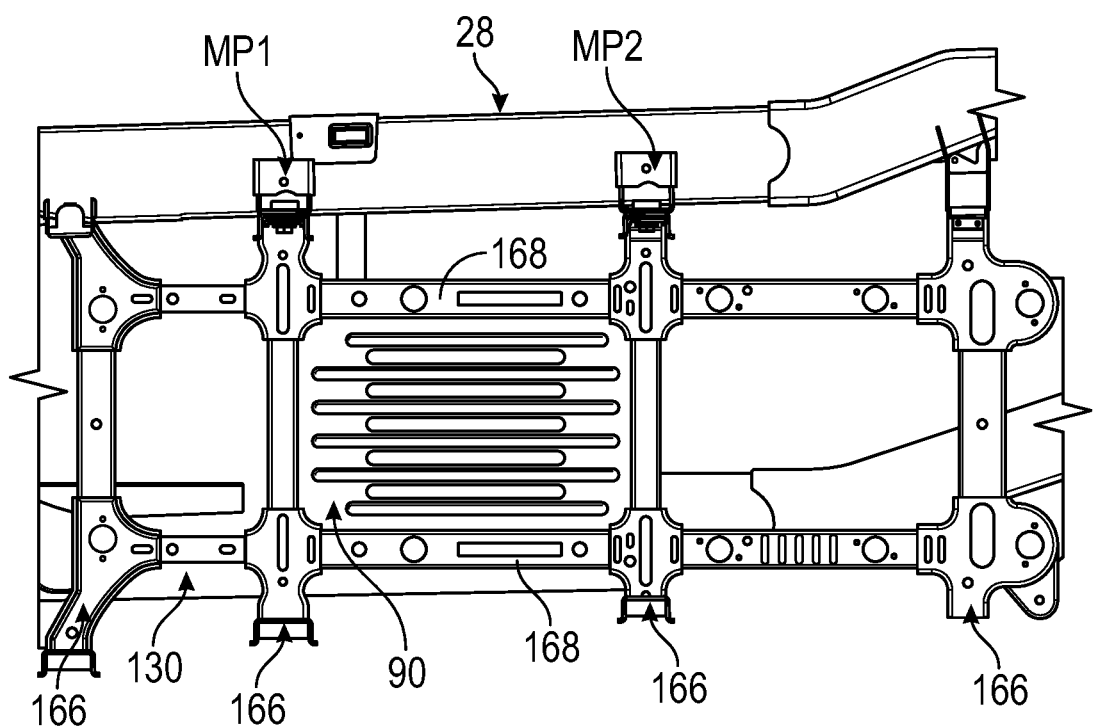
FIG. 8 illustrates another exemplary battery support structure.

FIG. 8 illustrates another exemplary battery support structure 130. The battery support structure 130 is similar to the battery support structure 30 described above. However, in this embodiment, the battery support structure 130 further includes a skid plate 90. The skid plate 90 is configured for protecting a battery pack (not shown in FIG. 8) from debris and projectiles that may ricochet off the ground surface toward the battery pack, thereby improving vehicle off-road capabilities. The battery support structure 130 may be mounted to a battery pack and to a vehicle frame 28 in the same or similar manner as described above.

In an embodiment, the skid plate 90 extends between adjacent cross member assemblies 166 of the battery support structure 130. For example, the skid plate 90 may extend between the cross members assemblies 166 located at the mid-portions MP1, MP2 of the battery support structure 130. The skid plate 90 may additionally extend between opposing beam sections 168 that connect between the cross member assemblies 166 located at the mid-portions MP1, MP2.

The battery pack support structures of this disclosure provide unique and optimized mounting solutions for supporting a battery pack relative to an electrified vehicle and for protecting and isolating the battery pack from various vehicle loads. The exemplary battery support structures may be configured to provide various unique features, including but not limited to, under-frame mounting configurations, cross member positioning, skid plate positioning for increased battery pack protection, weight optimized subcomponents, unique shapes for ground clearances, etc.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrified vehicle, comprising:
   a frame;
   a battery support structure mounted to the frame,
   wherein the battery support structure includes a first mounting surface that mounts outboard of an outboard surface of a first longitudinally extending rail of the frame and a second mounting surface that mounts inboard of the outboard surface of the first longitudinally extending rail,
   wherein the first mounting surface mounts to a first corresponding mounting surface of a first mounting bracket of the frame, and the second mounting surface mounts to a second corresponding mounting surface of a second mounting bracket of the frame;
   a first fastener received through an opening of the first mounting surface;
   a second fastener received through an opening of the second mounting surface; and
   a battery pack supported relative to the frame by the battery support structure.

2. The electrified vehicle as recited in claim 1, wherein the frame includes the first longitudinally extending rail, a second longitudinally extending rail, and a cross member extending between the first and second longitudinally extending rails, and the battery pack is positioned at least partially between the first and second longitudinally extending rails.

3. The electrified vehicle as recited in claim 1, wherein the battery support structure establishes a metallic exostructure that is a completely separate component from an enclosure assembly of the battery pack.

4. The electrified vehicle as recited in claim 3, wherein a gap extends between a tray of the enclosure assembly and the battery support structure.

5. The electrified vehicle as recited in claim 1, wherein the battery support structure includes a plurality of cross member assemblies and a plurality of beam sections that connect between the plurality of cross member assemblies.

6. The electrified vehicle as recited in claim 5, wherein each of the plurality of cross member assemblies includes a first bracket, a second bracket, and a beam that extends between the first and second brackets.

7. The electrified vehicle as recited in claim 6, wherein the first bracket and the second bracket each include at least one junction configured for receiving one of the plurality of beam sections.

8. The electrified vehicle as recited in claim 5, wherein a first cross member assembly of the plurality of cross members assemblies is positioned at a front portion of the battery support structure, a second cross member assembly of the plurality of cross member assemblies is positioned at a rear portion of the battery support structure, a third cross member assembly of the plurality of cross member assemblies is positioned at a first mid-portion of the battery support structure, and a fourth cross member assembly of the plurality of cross member assemblies is positioned at a second mid-portion of the battery support structure.

9. The electrified vehicle as recited in claim 5, wherein at least one sub-component of the plurality of cross member assemblies is made from a material having a first gauge and at least one sub-component of the plurality of beam sections is made from a material having a second gauge, wherein the second gauge is a different gauge than the first gauge.

10. The electrified vehicle as recited in claim 1, wherein the battery support structure includes a curved trim line.

11. The electrified vehicle as recited in claim 1, comprising a third fastener for coupling the battery pack, an isolator, and the battery support structure together, and a fourth fastener for mounting the isolator to the battery support structure.

12. The electrified vehicle as recited in claim 1, comprising a skid plate mounted between a first cross member assembly and a second cross member assembly of the battery support structure.

13. The electrified vehicle as recited in claim 1, comprising a plurality of isolators mounted between the battery pack and the battery support structure.

14. A method, comprising:
mounting a battery support structure to a battery pack;
mounting the battery support structure to a frame of an electrified vehicle, thereby supporting the battery pack relative to the frame,
wherein the battery support structure includes a first mounting surface that mounts directly beneath a longitudinally extending rail of the frame,
wherein mounting the battery support structure to the frame includes:
inserting a fastener through an opening of the first mounting surface and through a corresponding mounting surface of a mounting bracket of the frame; and
securing the fastener with a nut; and
wherein mounting the battery support structure to the battery pack includes:
inserting a fastener through the battery support structure, then through an isolator, and then into the battery pack.

15. The method as recited in claim 14, wherein the first mounting surface mounts inboard of an outboard surface of the longitudinally extending rail of the frame.

16. The method as recited in claim 15, wherein the battery support structure includes a second mounting surface that mounts outboard of the outboard surface of the longitudinally extending rail of the frame.

17. An electrified vehicle, comprising:
a frame;
a battery support structure mounted to the frame; and
a battery pack supported relative to the frame by the battery support structure,
wherein the battery support structure establishes a metallic exostructure that is a completely separate component from an enclosure assembly of the battery pack,
wherein a gap extends between a tray of the enclosure assembly and the battery support structure.

* * * * *